Figure 2:
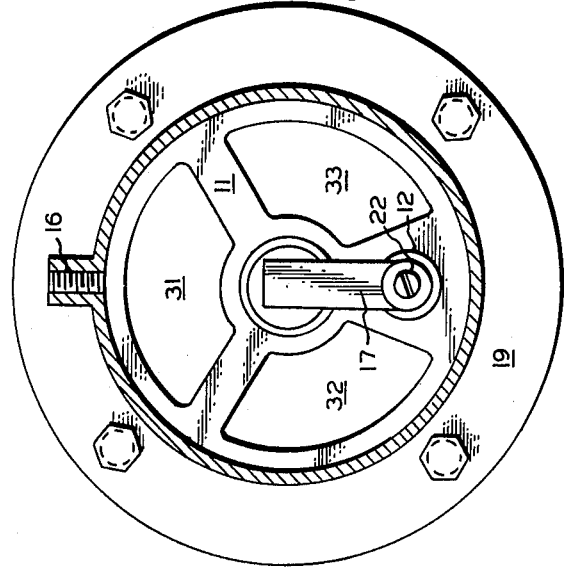

May 24, 1966  D. I. STEELE  3,252,324
MASS FLOWMETER
Filed Aug. 29, 1963

INVENTOR
DALE I. STEELE

BY *Fidelman & Wolffe*
ATTORNEYS

3,252,324
MASS FLOWMETER
Dale I. Steele, Silver Spring, Md., assignor to National Instrument Laboratories, Inc., Rockville, Md., a corporation of Maryland
Filed Aug. 29, 1963, Ser. No. 305,402
7 Claims. (Cl. 73—210)

The present application is a continuation-in-part of a prior copending application, Serial No. 801,576, now U.S. Patent No. 3,103,119.

This invention relates to fluid flow measurement. More particularly this invention relates to an arrangement for measuring the mass rate of flow.

The primary object of this invention is to provide a device for accurately measuring the mass rate of flow of a fluid through a conduit.

Further objects and the advantages of this invention will be apparent from the description which follows.

Conventional orifices, nozzles, and venturi tubes produce a differential pressure which is proportional to the product of the fluid density and the square of the volume rate of flow. It can then be shown that the product of the density and the differential pressure is proportional to the square the mass rate of flow of the fluid. It is one of the purposes of this invention to compensate for changes in density due to changes in pressure and temperature to produce a differential pressure proportional to the square of the mass rate of flow of the fluid over a flow range being measured.

Briefly stated the mass flowmeter of the instant invention is an arrangement of apparatus constructed and arranged so that vapor, liquid or gas flowing therethrough will experience a pressure drop proportional to the square of the mass flow. More explicitly, the square root of the pressure differential ($\Delta P$) is proportional to the mass flow rate (M). Measurement of the pressure differential will then determine the mass flow rate of the fluid. For brevity, the term fluid will hereinafter be employed for both liquids (incompressible fluids) and gases (compressible fluids).

This desired object is attained by providing a plate member or an equivalent structure transversely disposed across the flow path, with an opening in the plate through which all the fluid must flow. The opening is formed into an annular orifice by a shaped, relatively movable plug disposed centrally of the opening. Relative movement of the plug and plate is effected by a sealed pressure-temperature responsive element, e.g., bellows, bourdon tube, diaphragm, etc. It can be demonstrated mathematically that the square root of the pressure drop through such an annular orifice is a unique measure of the mass flow rate.

The equation relating flow rate to head developed as taken directly from "Fluid Mechanics" by Dodge & Thompson, McGraw-Hill, 1937, Chapter 11, Equation 13 is given as follows:

(1) $$Q = CA\sqrt{2gH}$$

where

Q is the volumetric rate of flow,
A is the orifice area,
g is the gravitational coefficient,
H is the difference in head, and
C is the coefficient of discharge.

The terms above must be expressed in consistent units.

(2) $$H = \frac{\Delta P}{pg}$$

Where $\Delta P$ is the differential pressure, and
p is the fluid density.

The substitution of Equation 2 in Equation 1 gives Equation 3, which is the usual form of the equation for gas flow through an orifice.

(3) $$Q = CA\sqrt{2\frac{\Delta P}{p}}$$

Multiplying both sides of the equation by p gives (4) $$pQ = CA\sqrt{2p\Delta P}$$

It is seen that the product pQ is mass rate of flow designated as M in (5) $$M = CA\sqrt{2p\Delta P}$$

or (6) $$\sqrt{\Delta P} = \frac{1}{CA\sqrt{2p}} \cdot M$$

For a specific gas, p is a function of pressure and temperature as given by (7) $$p = \frac{P}{RT}$$

Where

P is the absolute pressure,
T is the absolute temperature, and
R is a constant for the gas.

Substitution of this expression for p in Equation 6 gives:

(8) $$\sqrt{\Delta P} = \frac{\sqrt{R}}{CA\sqrt{2}} \cdot \sqrt{\frac{T}{P}} \cdot M$$

When the gas is enclosed in a bellows having negligible spring constant, the pressure inside the bellows is equal to the pressure of the gas outside the bellows. Since the bellows is surrounded by the flowing gas, the temperature of the gas inside the bellows is the same as the temperature of the flowing gas. The Boyles' law relation for a gas is that PV/T remains constant. The bellows length is then proportional to the absolute temperature and inversely proportional to the pressure.

Substituting L to T/P in Equation 8, and setting the product of all the constants equal to a new constant, $K_1$, gives (9) $$\sqrt{\Delta P} = \frac{K_1}{A} \cdot \sqrt{L} \cdot M$$

where L is the bellows length.

If $\sqrt{\Delta P}$ is to be proportional to M, then the following condition must hold.

(10) $$A = K_1\sqrt{L}$$

That is, when the plug is so shaped that the annular area of the orifice is proportional to the square root of the bellows length (which is dependent upon the gas temperature and pressure), then the square root of the differential pressure across the annular orifice is proportional to the mass rate of flow of the gas.

In the above analysis it was assumed that the spring constant of the bellows was negligible. For certain applications it is not advantageous or practical to choose such a bellows assembly. In such a case, it is still possible to shape the plug such that total compensation for variation in P and partial compensation for variation in T are attained, or alternatively to attain total compensation for T and partial compensation for P. In practice, the choice of whether to compensate totally for P or for T is governed by the expected magnitudes of the variations of each and the errors which would be produced by the variation of each. By and large no problem has been found in coming within the conventional accuracy limit of 2% throughout the normal operating ranges for flow, temperature and pressure.

As a matter of machine-shop practice, the plug is made oversize and of the general shape given by theory. The entire instrument is assembled, then laboratory tested for the intended installation over the expected flow range, after which the plug diameter is reduced in differing amounts along the plug's length whatever degree is indicated by the tests.

Deviations from the above ideal theory are known to arise from two sources, each of which can be taken care of in the final calibration and adjustment of the plug: (1) the orifice coefficient, C, in the above equations may vary slightly as the ratio of the plug diameter to orifice diameter changes; and (2) the effective area of the orifice is not always the free annular area left in the plate opening. On occasion, the orifice area becomes the area of a conical surface which extends from the orifice wall to the nearest part of the plug.

In the case where the flowing fluid is a liquid, the bellows is filled with the same liquid. The density of the fluid inside the bellows remains the same as the density of the flowing fluid and the length of the bellows changes in a more exact inverse proportion to the density than in the case of gases.

Referring to Equation 6, if the bellows length is inversely proportional to the fluid density,

(11) $$\sqrt{\Delta P} = \frac{K_2 M \sqrt{L}}{A}$$

The necessary condition for $\sqrt{\Delta P}$ to be proportional to M is then that

(12) $$A = K_2 \sqrt{L}$$

That is, when the plug is so shaped that the annular area of the orifice is proportional to the square root of the bellows length (which is dependent upon the liquid temperature) then the square root of the differential pressure across the orifice is proportional to the mass rate of flow of the liquid.

Mass flow meters constructed according to the foregoing principles are known to the art, as for example prior co-pending application, Serial No. 801,576, describes such a flow meter.

It has now been discovered that accurate metering does not require passage of all the fluid flow through the compensating orifice. A theoretically sound measurement of mass flow can be obtained by employment of an orifice plate having a plurality of orifices therethrough where only one of the orifices is a compensating orifice of the nature shown in the aforementioned application Serial No. 801,576. The compensation made by varying the area of only the one orifice while the others are left unrestricted is sufficient for purposes of mass flow measurement. As a practical matter this construction is particularly adapted for effecting pressure and temperature compensation over a relatively narrow range of temperature and pressure. It should be borne in mind that for many instances where mass flow is to be metered, as for example in a buried pipe line, the temperature and pressure fluctuations of the flowing fluid are minimized to whatever extent possible.

Compared to a mass flow meter where all the fluid must pass through the compensating orifice, the present multi-orifice structure permits use of a smaller bellows and plug, and in general provides a less costly flow meter.

That flow through parallel orifices can be employed is demonstrable mathematically, thus:

(5) $$M = CA\sqrt{2p\Delta P}$$

If two orifices having areas of $A_1$ and $A_2$ are connected in parallel so that both have the same differential pressure across them, then

(13) $$M = (C_1 A + C_2 A)\sqrt{2p\Delta P}$$

and for any number of orifices

(14) $$M = \sqrt{2p\Delta P} \; \Sigma CA$$

If one orifice is variable and the others fixed in area.

(15) $$M = (C_v A_v + \Sigma C_f A_f)\sqrt{2p\Delta P'}$$

where $v$ is a subscript for the variable orifice and $f$ is a subscript for the fixed orifices.

Since (7) $p = P/RT$

(16) $$M = (C_v A_v + \Sigma C_f A_f)\sqrt{\frac{2p\Delta P}{RT}}$$

or

(17) $$\Delta P = \frac{M^2 RT}{2(C_v A_v + \Sigma C_f A_f)^2 P}$$

Equation 17 shows that $\Delta P$ is proportionate to $M^2$ if everything else in the equation beside M and $\Delta P$ are constant or

(18) $$\frac{RT}{2(C_v A_v + \Sigma C_f A_f)^2 P} = K_3$$

or

(19) $$\frac{1}{C_v A_v + \Sigma C_f A_f} = \sqrt{\frac{2K_3 P}{RT}}$$

or

(20) $$C_v A_v + \Sigma C_f A_f = \sqrt{\frac{RT}{2k_3 P}}$$

and

(21) $$A_v = \frac{1}{C_v}\left(\sqrt{\frac{RT}{2k_3 P}} - \Sigma C_f A_f\right)$$

A plug and properly filled bellows can be shaped so that the variable area is given by Equation 21 so long as $$\sqrt{\frac{RT}{2cP}} - \Sigma C_f A_f$$

is positive.

One theoretical limit for the multiorifice system is that combination of maximum pressure and minimum temperature which makes $A_v = 0$. The practical limit is usually reached when the plug has blocked off about 95% of the open area of the variable orifice.

The other theoretical limit for the combination (minimum) pressure and (maximum) temperature occurs when the plug is completely withdrawn from the variable orifice so that further variation is impossible.

While only bellows have been mentioned in the foregoing analysis, it should be understood that the same follows generally, for all fluid filled pressure and temperature responsive means whose response is a linear movement, e.g., bellows, bourdon tube, diaphragm, etc.

Figure 1:
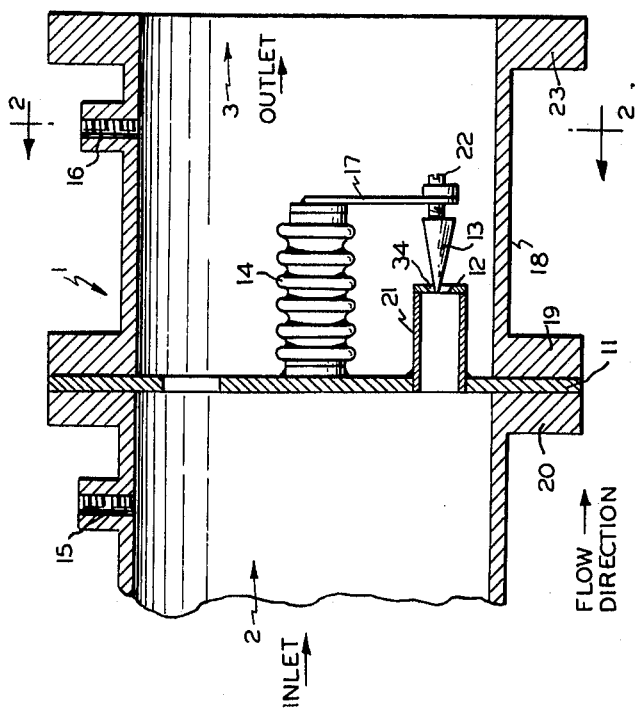

For further understanding of the instant invention, reference is made to the attached drawing wherein:

FIG. 1 diagrammatically illustrates a cross-sectional view of a flow meter constructed according to the present invention.

FIG. 2 represents a section taken through line 2—2 of FIG. 1.

Referring now to FIG. 1 of the drawing it may be seen that the mass flow meter of the present invention constitutes an encased assemblage which can be interposed physically in a closed conduit, e.g. a pipe line, to take the enitre gas flow. Gas enters a cylindrical casing through an inlet end 2 and leaves by way of an outlet end 3. An orifice plate 11, transversely disposed across the flow path, is secured at its periphery to the inner wall of casing 1 in any suitable manner which prevents gas leakage, e.g. by welding or (as shown) by means of flanges 19, 20. As shown in FIG. 2, orifice plate 11 has a plurality of orifices therethrough. In the illustrated mode of the invention a plurality of fixed area segment shaped orifices 31, 32, 33 provide unobstructed flow paths for the gas and an annular partially obstructed compensating orifice 34 (FIG. 1) provides temperature and pressure compensated flow. Compensating orifice 34 conveniently is disposed on the end of a tube 21 suitably attached to the orifice plate 11 by soldering or welding.

Shaped plug 13 partially blocks the compensating orifice 34, the position of plug 13 determining the effective open area of the compensating orifice. A completely sealed fluid filled bellows 14 containing gases, mounted on the rear of orifice plate 11 and attached to a shaped plug 13 by means of a rigid arm 17, determines the position of shaped plug 13 in orifice 34 through compression of the bellows 14 due to an increase in line pressure or a decrease in line temperature (and conversely extension by line pressure decreases or line temperature increases). Arm 17 is suitably attached to shaped plug 13, e.g., by adjusting screw 22. Tube 21 can, of course, be omitted, being a construction convenience so that a short rather than a long adjusting screw 22 can be employed to attach bellows 14 to shaped plug 13.

The differential pressure of the gas flow across parallel orifices 31, 32, 33 and 34 is measured by attaching a manometer or suitable differential pressure gauge or recorder across the pressure taps 15 and 16.

Since the casing 18 of the housing 1 can easily be constructed to withstand the line pressure the flowmeter as a whole is adapted for insertion into a pipe line by means of integral end flanges such as flange 23 or by terminal screw threads or by any other generally accepted method of joining pipe sections.

Allusion has already been made to the fluid filled sealed character of bellows 14. An appropriate fluid sealed inside this chamber when the instrument is intended to meter mass flow of gases which follow closely the perfect gas law can be any permanent gas, e.g., air, nitrogen, helium, argon, etc. Often the gas being metered can be employed to fill the bellows. When a gas deviating significantly from the perfect gas laws is to be metered, the gas sealed inside the bellows should be of the same composition as the gas being metered. The expansion or contraction of bellows 14 with line pressure and temperature is thereby related exactly to the pressure-temperature properties of the flowing gas.

The end of plug 13 is shaped according to the following equation:

$$(22) \qquad d = \sqrt{D^2 - \frac{4}{\pi}A}$$

Where $d$ is the diameter of the plug in the plane of the orifice plate, $D$ is the diameter of the orifice opening, $A$ is the area of the variable orifice 34 computed from equation 10 or 12

The plug diameter, $d$, is calculated for several points along its longitudinal axis. Then the contour of the plug is machined to fit the calculated points and be smooth overall according to well known shop practices. Lastly any necessary diameter reduction is made in accord with laboratory test results for the intended installation.

Thus when fluid flows from inlet 2 through the several annular orifices 31, 32, 33, 34 then out outlet 3, the bellows 14 reaches an equilibrium position based upon the absolute temperature and pressure of the flowing fluid. The bellows in turn fixes the area of variable orifice 34 by fixing the location of shaped plug 13 relative to plate opening 12 at each pressure-temperature condition in accord with Equation 10. As a result, the pressure differential across orifice plate 11, which may be measured by a manometer or other differential pressure sensing device (not shown) connected to differential pressure taps 15, 16, is related to true mass flow M in accord with Equation 8. If the line pressure increases or the fluid temperature decreases, for example, contraction of the bellows moves shaped plug 13 forward, decreasing the area of annular orifice 34, thereby satisfying Equation 10 to insure that the square root of the differential pressure remains proportional to the mass rate of flow at all times.

From the foregoing discussion of the theory, the construction, and the operation of a preferred mode of mass flow meter, the present invention will be readily understood and further explanation thereof is believed unnecessary. However, since numerous modifications and changes will occur to those skilled in the art it should be understood that the foregoing description has been posed entirely in terms of preferred embodiments of the present invention and that there is no desire to limit the invention other than as set forth in the hereinafter appended claims.

I claim:

1. An instrument for measuring mass flow of fluid passing through a closed conduit which comprises a plate member disposed transversely across the flow path for all of the fluid passing through said conduit; a multiplicity of orifices in said plate permitting fluid to flow therethrough; at least one of said orifices being of fixed area and at least one being a compensating orifice as hereinafter described; said compensating orifice being formed by a circular opening in said plate and a shaped plug extending therethrough partially blocking the circular opening; said plug being connected to a closed, fluid-filled bellows for relative movement axially of the circular opening in accord with expansion and contraction of said bellows as induced by temperature and pressure changes in the flowing fluid to thereby alter the effective cross-sectional area of the compensating orifice upon the expansion and contraction of the bellows, wherefore the square root of the pressure differential across the orifice containing plate is proportional to the mass flow rate through the conduit over a predetermined temperature and pressure range; and means for measuring the pressure differential across the orifice containing plate.

2. The instrument of claim 1 wherein one end of the bellows is fixed to the orifice containing plate and the opposing end is linked to the shaped plug to cause the plug movement relative to the compensating orifice opening in said plate.

3. An instrument for measuring mass flow of fluid passing through a closed conduit, which comprises a plate member disposed transversely across the flow path for all of the fluid passing through said conduit; a multiplicity of orifices in said plate permitting fluid to flow therethrough from the upstream to the downstream side thereof; a fluid-filled flexible member, said flexible member adapted to move in response to the temperature and pressure changes of said fluid flowing within said conduit; a shaped plug connected to said flexible member, said plug being adapted to move axially of said plate in response to the movement of said flexible member, at least one of said orifices having a shape conforming to the cross-sectional shape of said plug, said shaped orifice and said plug coacting to form an orifice of variable area as determined by said motion of said plug with respect to said plate, wherefore the square root of the pressure differential between the upstream and downstream sides of said plate is proportional to the mass flow rate through the conduit over a predetermined temperature and pressure range;

and means for measuring the pressure differential between the upstream and downstream sides of said plate.

4. The instrument of claim 3 wherein said plate is adapted to be affixed to and disposed between annular flange portions provided on oppositely disposed sections of said conduit.

5. The instrument of claim 3 wherein the flexible member is affixed to the downstream surface of said plate.

6. The instrument of claim 3 wherein said flexible member is a bellows.

7. The instrument of claim 6 wherein the fluid contained within said bellows is identical to the fluid flowing through said conduit.

References Cited by the Examiner
UNITED STATES PATENTS

| | | | |
|---|---|---|---|
| 2,549,624 | 4/1951 | Moore | 73—205 |
| 2,549,625 | 4/1951 | Moore | 73—205 |

RICHARD C. QUEISSER, *Primary Examiner.*